Figure 1:
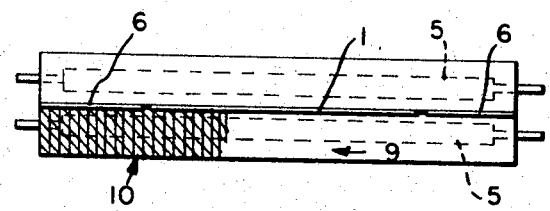

INVENTOR
CHARLES R. SMOOT

BY *Samuel A. Blight*
ATTORNEY

United States Patent Office 3,450,552
Patented June 17, 1969

3,450,552
PROCESS FOR INCORPORATING PHOTO-
STABILIZERS IN POLYVINYL BUTYRAL
SHEETING
Charles Richard Smoot, Vienna, W. Va., assignor to E. I. du Pont de Nemours and Company, Wilmington, Del., a corporation of Delaware
Filed Oct. 21, 1966, Ser. No. 588,572
Int. Cl. B44d 1/24, 1/10; B29d 11/00
U.S. Cl. 117—16                                13 Claims This invention relates to polyvinyl butyral sheeting, and, more particularly, to a process for incorporating photo-stabilizers in plasticized polyvinyl butyral sheeting.

Polyvinyl butyral sheeting is used as the interlayer of safety glass and is often partially tinted to effect a reduction in glare on vehicle windshields. The dyes employed in tinting windshields are subject to photolytic decomposition, due especially to ultraviolet radiation. Hence, it is desirable to add photostablizers to tinted sheeting.

The term "polyvinyl butyral" refers to the resin formed by reacting butyraldehyde with polyvinyl alcohol. Alcohol groups left unreacted are calculated as the percent vinyl alcohol remaining in the polymer. Present-day safety glass laminates commonly employ a plastic interlayer comprising a resin of polyvinyl alcohol partially condensed with butyraldehyde, the resin containing 15–30% unreacted hydroxyl groups, calculated as weight percent of vinyl alcohol; less than 3% of ester groups, calculated as weight percent of vinyl acetate; and the remainder acetal groups, calculated as vinyl butyral. This plastic interlayer is commonly called "polyvinyl butyral," or more exactly "partial polyvinyl butyral." A plasticizer is employed in the plastic interlayer, generally a water-insoluble ester of a polybasic acid or of a polyhydric alcohol. Those plasticizers particularly desirable for use in the present invention are triethylene glycol di(2-ethyl butyrate), dibutyl sebacate, di(betabutoxyethyl)adipate, and dioctyl phthalate.

Prior art processes for the incorporation of photostabilizers into plastics have included (1) dissolving photostabilizers in a plasticizer prior to addition of the latter to the resin to be plasticized, (2) dry blending of photostabilizer with resin powder or granules prior to processing, (3) and, in the case of photostabilizers of low solubility in the resins, placing resin pellets in contact with a solution of the photostabilizer to cause photostabilizer to be absorbed on the resin surface, prior to dispersion of the photostabilizer in the resin during extrusion. Such prior art processes thus result in distribution of photostabilizer throughout the entire width of polyvinyl butyral sheeting.

The present process provides a method for the addition of photostabilizer to the entire width of sheeting, or in a preferred embodiment, to a localized (i.e., tinted) area of the polyvinyl butyral sheeting. Since photostabilizer can thus be added only to the tinted area of partially tinted sheeting where photolytic protection is desired, the present process is especially attractive economically.

Plasticized polyvinyl butyral sheeting tends to stick, or adhere, to itself when stored in roll form at temperatures above 15° C. Hence, cold storage of rolls of sheeting, or powdering of the sheeting prior to winding on rolls, has been employed to prevent such self-sticking. Powdering is more often employed. The process of the present invention, for incorporation of photostabilizers into resin, is conducted in conjunction with the powdering process.

The present invention is a process for the intimate incorporation of a photostabilizer into plasticized polyvinyl butyral sheeting, during application of inert powder thereto to prevent sticking, the process comprises coating the surface of said sheeting with a mixture of an inert powder and a photostabilizer which is soluble in the plasticized resin, then maintaining the powder-coated sheeting at a temperature up to about 75° C., whereby the photostabilizer diffuses into the sheeting. According to this invention, it is possible to add a mixture of photostabilizer and inert powder only to the tinted area of partially tinted sheeting, while adding only inert powder to the remainder of the width of sheeting.

Photostabilizers useful in the present porcess are those which are soluble in plasticized polyvinyl butyral resin. Useful types of ultraviolet photostabilizers are: 2-(2'-hydroxyphenyl)benzotriazoles, 2 - hydroxybenzophenones, substituted acrylonitriles, and silicylic acid derivatives. Typical benzotriazole stabilizers are described in detail in British Patents 991,142, 991,204 and 991,320.

Illustrative of specific photostabilizers useful in this process are: 2 - (2' - hydroxy-3'-t-butyl-5'-methylphenyl)-chlorobenzotriazole, available commercially from Geigy Chemical as "Tinuvin 326"; ethyl-2-cyano-3-phenyl cinnamate; phenyl salicylate; 2,2'-dihydroxy - 4 - methoxybenzophenone; and 2-(2'-hydroxy-5'-methylphenyl)benzotriazole. The preferred ultraviolet stabilizer employed in this process is 2-(2'-hydroxy-5'-methylphenyl)benzotriazole.

The inert powder which is used to prevent sticking of plasticized polyvinyl butyral sheeting and as a carrier of photostabilizer according to this invention is commonly, and preferably, sodium bicarbonate. If desired, it is possible to use other materials for this purpose, for example, potassium bicarbonate, sodium carbonate, potassium carbonate, or diatomaceous earth.

The application of the mixture of photostabilizer and inert powder in the first step of this invention can be accomplished in a variety of ways. For example, the powder mixture can be sprinkled onto the sheeting, or the sheeting can be passed through a bed of the powder mixture. It is possible to add photostabilizer to only the tinted region of partially tinted sheeting by either method.

The diffusion of photostabilizer into the sheeting is accomplished by maintaining the powder-coated sheeting at a temperature up to about 75° C., above which temperature polyvinyl butyral sheeting tends to sag. The higher the temperature of this step, the shorter the time required to effect diffusion of the photostabilizer into the sheeting. Generally, when temperature is in the range 40–70° C., a time of 4–21 days is sufficient to cause diffusion of significant amounts of photostabilizer into the sheeting. The preferred conditions are at 55–65° C. for 5–10 days.

The localization of photostabilizer so that it is added to the tinted areas of partially tinted sheeting as the entire width of the sheeting is coated with inert powder is one of the most significant embodiments of this invention. Control over the composition of the material sprinkled onto sheeting is easily maintained, since two sprinklers can be used, one to supply inert powder alone and another to supply photostabilizer alone or a mixture of inert powder and photostabilizer. When the coating is applied by passage of sheeting through a powder bed, photostabilizer or a mixture of photostabilizer and inert powder can be added to the end of the bed through which the tinted edge of the sheeting is passed, and the other end of the bed can be kept filled with inert powder only, so that the direction of powder flow in the powder bed is maintained toward the tinted edge of the sheeting.

It is preferred that sufficient photostabilizer be added to the powder mixture that an amount of photostabilizer about 0.1–2.0% by weight be diffused into the tinted plasticized sheeting during maintenance at the temperature noted above. The optimum amount of photostabilizer is 0.1–0.4% by weight of the tinted plasticized sheeting. The powder coating on the plasticized sheeting is generally 3–8% of the weight of the sheeting, for 30-mil thick sheeting.

A more complete understanding of the present invention may be had by reference to the drawing attached hereto and made a part of the specification, wherein a preferred embodiment of this invention is depicted, that of applying by passage through a powder bed a coating of photostabilizer and inert powder to tinted area of partially tinted sheeting and applying mostly inert powder to the untinted areas, prior to maintenance of the powder coated sheeting at elevated temperature to allow diffusion of the photostabilizer into the sheeting.

Figure 2:
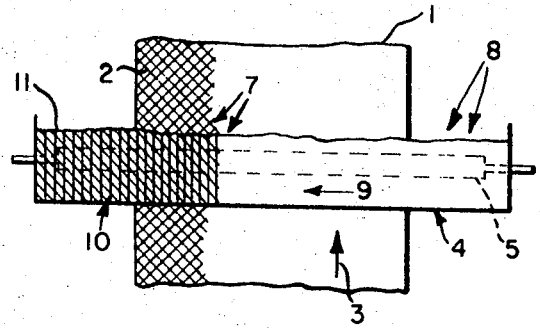

In the drawing:

FIGURE 1 is a schematic view from the top of the process of application of powder to partially tinted areas of the sheeting, and FIGURE 2 is a schematic view from the side of the same process.

The sheeting is designated by 1, the tinted area thereof as 2. The sheeting advances in the direction 3 through the powder bed 4 which is nearly filled with powder (to a level designated by 11), and then between rotating mixer-conveyors 5. Baffles 6, perpendicular to the bottom of the powder bed and in the same plane as the width of advancing sheeting, nearly abut the sheeting, thus minimizing cross flow out of section 10 of the powder bed. Baffles 6 are omitted from FIGURE 2 for clarity.

The photostabilizer, or a mixture of photostabilizer and inert powder, is fed into the powder bed 4 at location 7 (a mixture is generally used for convenience of metering), while an excess of inert powder alone is fed into the bed at 8. Thus, the direction of powder flow within the bed is 9, and most of the mixture of photostabilizer and inert powder is at 10, while the remainder of the powder bed is almost exclusively inert powder.

The following examples are presented to illustrate but not to restrict the present invention. Percentages and parts are expressed by weight unless otherwise noted.

The amount of photostabilizer in plasticized sheeting which had been coated and stored according to this invention was determined by dissolving a sample of the sheeting in methanol and examining the ultraviolet spectrum thereof. An absorbance band characteristic of the particular photostabilizer was examined to determine the amount of photostabilizer present in the sheeting, the intensity of such ultraviolet absorbance bands being proportional to the concentration of the photostabilized in the methanol solution examined. The ultraviolet absorbance band employed in the determination of each ultraviolet absorber examined herein is as follows: 2-(2'-hydroxy - 3' - t - butyl - 5' - methylphenyl)chlorobenzotriazole, 308 millimicrons; ethyl-2-cyano-3-phenyl cinnamate, 298 millimicrons; phenyl salicylate, 315 millimicrons; 2,2' - dihydroxy-4-methoxybenzophenone, 282 millimicrons; 2 - (2' - hydroxy - 5' - methylphenyl)benzotriazole, 335 millimicrons.

The plasticized polyvinyl butyral sheeting employed in the examples below was sheeting of 30-mil thickness comprising 22–23% unreacted hydroxyl groups, calculated as weight percent vinyl alcohol; and 44–47 parts of triethylene glycol di(2-ethyl butyrate) as a plasticizer per 100 parts of polyvinyl butyral, i.e., about 29% of the plasticized resin was plasticizer.

The sodium bicarbonate powder used herein had a particle size such that 70–85% of the powder passed through a 325-mesh screen, whereas the potassium bicarbonate powder used herein had a particle size such that 45–65% thereof passed through a 200-mesh screen. The dyes actually used herein were similar to those described in U.S. Patent 3,008,858, issued on Nov. 14, 1961, to N. Blake, G. Daendliker, and W. Holstein.

EXAMPLE I

Photostabilizer was added across the entire width of plasticized polyvinyl butyral sheeting about 36 inches wide and 30 mils thick by coating each side of the polyvinyl butyral sheeting with a powder mixture of 2-(2'-hydroxy - 5' - methylphenyl)benzotriazole photostabilizer and sodium bicarbonate, the powder mixture comprising 4.17% photostabilizer, by drawing the sheeting through a bed of powder. The coated sheeting was then wound onto a roll. The weight of the powder coating was about 3.6% of the weight of the sheeting.

The roll was then maintained at 55–65° C. for 4.5 days to allow diffusion of photostabilizer into the sheeting. The remaining powder mixture was then removed from the sheeting by washing with warm demineralized water and the sheeting was air-dried at room temperature. Analysis of samples of the sheeting showed that the average amount of photostabilizer across the width of sheeting was 0.22%.

EXAMPLES II–VI

Polyvinyl butyral sheeting (about 36 inches wide and 30 mils thick) with a tinted band along one edge was coated with a powder mixture of sodium bicarbonate and 2-(2'-hydroxy-5'-methylphenyl)benzotriazole in the tinted region and area adjacent thereto, and with sodium bicarbonate alone in most of the clear area. The fadeout region of the tinted band was about 8 inches from the tinted edge of the sheeting.

The powder was applied by drawing the sheeting at a rate of 80 feet per minute through a bed of powder, as in the figures, then winding the sheeting onto rolls. The powder bed had been filled initially with a sodium bicarbonate-photostabilizer mixture comprising 8.5% photostabilizer. As the coating operation proceeded, a mixture of 25% photostabilizer and 75% sodium bicarbonate was added continuously at the fadeout region 7 at a rate of about 8 pounds per hour. Sodium bicarbonate was added continuously at 8 to keep the powder bed filled. The weight of the powder coating on the sheeting was in the range of 6–8% of the weight of the sheeting.

Rolls of the sheeting were then maintained for 3.5 days at 55–65° C. Samples were analyzed to determine the level of photostabilizer in the sheeting as a function of distance from the tinted edge of the sheeting. The results are presented in Table 1 and indicate that the photostabilizer transferred from the powder to the sheeting.

EXAMPLES VII–XI

Plasticized polyvinyl butyral sheeting was powder-coated as in Examples II–VI, then rolls of the powder coated sheeting were maintained at 55–65° C. for 10 days.

The level of photostabilizer at the clear portion of the sheeting just adjacent to the fadeout region, that is, at about 9 inches from the tinted edge of the sheeting, was determined as above. Table 2 shows data obtained from samples taken from the interior of the sheeting roll and from the exterior of the sheeting roll.

EXAMPLES XII–XVI

Small samples of the plasticized polyvinyl butyral sheeting were coated with mixtures of a photostabilizer and inert powder, then stored in an oven at 65° C. for the times indicated in Table 3. The weight percentages of photostabilizer in (1) the powder mixture before coating, (2) the powder removed from the sheeting after maintenance thereof at elevated temperature, and (3) the sheeting after maintenance thereof at elevated temperature are presented in Table 3.

In the runs designatd A in Examples XII–XVI, the coating method of Example I was employed to apply a large excess of the powder mixture (the powder coating was about 10% of the weight of the sheeting). These runs indicate the maximum amount of photostabilizer which will transfer under the conditions noted.

In the runs designated B in Examples XII–XV, the coating method of Example I and the powder mixtures of runs A in Examples XII–XV were employed. However, a smaller amount of the powder mixture (approximately 3% of the weight of the sheeting) was employed.

TABLE 2.—AMOUNT OF 2-(2'-HYDROXY-5'-METHYL-PHENYL)BENZOTRIAZOLE AT 9 INCHES FROM EDGE OF SHEETING AS FUNCTION OF DISTANCE FROM CENTER OF ROLL AFTER 10 DAYS AT 65° C.

| Example | Weight percent of photostabilizer in plasticized sheeting | |
|---|---|---|
| | Near core of roll | Near periphery of roll |
| VII | 0.19 | 0.24 |
| VIII | 0.12 | 0.16 |
| IX | 0.23 | 0.18 |
| X | 0.23 | 0.23 |
| XI | 0.13 | 0.20 |

TABLE 3.—TRANSFER OF ULTRAVIOLET STABILIZERS FROM POWDER COATING TO PLASTICIZED POLYVINYL BUTYRAL SHEETING

| Example | Ultraviolet stabilizer | Inert powder | Run | Maintenance at 65° C. | Percent ultraviolet stabilizer | | |
|---|---|---|---|---|---|---|---|
| | | | | | Initially in powder, percent | After heat treatment | |
| | | | | | | In powder, percent | In sheeting, percent |
| XII | 2-(2'-hydroxy-3'-t-butyl-5'-methylphenyl)-chlorobenzotriazole. | KHCO$_3$ | A | 5 | 9.1 | 7.5 | 1.31 |
| | | | B | 7 | 9.1 | 4.3 | 1.37 |
| | | | C | 7 | 2.5 | 0.02 | 0.46 |
| XIII | do | NaHCO$_3$ | A | 5 | 9.1 | 8.1 | 0.86 |
| | | | B | 7 | 9.1 | 1.8 | 1.22 |
| | | | C | 7 | 2.5 | 0.03 | 0.56 |
| XIV | Phenyl salicylate | NaHCO$_3$ | A | 5 | 9.1 | 1.2 | 1.01 |
| | | | B | 7 | 9.1 | 0.71 | 0.92 |
| | | | C | 7 | 2.5 | 0.0 | 0.26 |
| XV | 2,2'-dihydroxy-4-methyoxybenzo-phenone. | NaHCO$_3$ | A | 5 | 9.1 | 0.43 | 1.04 |
| | | | B | 7 | 9.1 | 0.23 | 0.76 |
| XVI | 2-(2'-hydroxy-5'-methylphenyl)benzotriazole. | NaHCO$_3$ | A | 5 | 9.1 | 0.0 | 0.94 |

In the runs designated C in Examples XII–XIV, lower photostabilizer concentrations were applied by sprinkling, rather than by passage through a powder bed. The powder coating was about 3% of the weight of the sheeting; substantially all the photostabilizer transferred from the powder coating to the sheeting in runs C.

The tinted portion of the sheeting requires the most protection against photolytic decomposition in the fade-out or transition region between darkly tinted sheeting to clear, untinted sheeting. Somewhat less photostabilizer is required in the dark, heavily tinted portion of the tinted band. The powder application step of the present invention can be employed to provide the maximum concentration of photostabilizer at the fadeout region by adding photostabilizer to the sheeting in a gradient according to the preferred embodiment depicted in the drawing, so that the greatest concentration of photostabilizer occurs in the fadeout region, with a gradual decrease in photostabilizer concentration in the heavily tinted area, accompanied by a sharp decrease in photostabilizer concentration in the untinted area adjacent to the fadeout region.

The foregoing detailed description has been given for clearness of understanding. The invention is not limited to the exact details shown and described since obvious modifications will occur to those skilled in the art.

TABLE 1.—AMOUNT OF 2-(2'-HYDROXY-5'-METHYL-PHENYL)BENZOTRIAZOLE AS A FUNCTION OF DISTANCE FROM EDGE OF SHEETING AFTER 3.5 DAYS AT 65° C.

| Distance from tinted [1] edge of sheeting (in.) | Weight percent of photostabilizer in plasticized sheeting | | | | |
|---|---|---|---|---|---|
| | Ex. II | Ex. III | Ex. IV | Ex. V | Ex. VI |
| ½ | 0.18 | | 0.22 | 0.14 | 0.19 |
| 2 | 0.18 | 0.28 | 0.30 | 0.24 | 0.24 |
| 4 | 0.19 | 0.31 | 0.31 | 0.32 | 0.25 |
| 6 | 0.20 | 0.36 | 0.32 | 0.38 | 0.29 |
| 8 | 0.22 | 0.32 | 0.29 | 0.42 | 0.26 |
| 10 | 0.11 | 0.09 | 0.15 | 0.26 | 0.11 |
| 12 | 0.02 | 0.01 | 0.02 | 0.02 | 0.03 |
| 14 | | 0.00 | 0.00 | 0.00 | 0.02 |

[1] Since tinting dyes interfere with the ultraviolet analysis for photostabilizer content, each roll of sheeting was produced with a short length containing no tinted band on which analyses were performed.

I claim:

1. A process for the intimate incorporation of photostabilizers into plasticized polyvinyl butyral sheeting, which comprises (1) applying to the surface of said sheeting a coating of a powder mixture comprising a photostabilizer which is soluble in said sheeting and an inert material, and (2) maintaining the coated sheeting at a temperature up to about 75° C. for a period of time sufficient to allow said photostabilizer to diffuse into said sheeting.

2. A process according to claim 1 wherein said photostabilizer is selected from the class consisting of 2-(2'-hydroxyphenyl)benzotriazoles, 2-hydroxybenzophenones, substituted acrylonitriles, and salicylic acid derivatives.

3. A process according to claim 2 wherein said photostabilizer is 2-(2'-hydroxy-5'-methylphenyl)benzotriazole.

4. A process according to claim 2 wherein said photostabilizer is 2-(2'-hydroxy-3'-t-butyl-5'-methylphenyl)chlorobenzotriazole.

5. A process according to claim 2 wherein said photostabilizer is ethyl-2-cyano-3-phenyl cinnamate.

6. A process according to claim 2 wherein said photostabilizer is phenyl salicylate.

7. A process according to claim 2 wherein said photostabilizer is 2,2'-dihydroxy-4-methoxybenzophenone.

8. A process according to claim 1 wherein step (2) is conducted at a temperature in the range 40–70° C. for a period of time in the range 4–21 days.

9. A process according to claim 1 wherein the inert material is selected from the class consisting of sodium bicarbonate, potassium bicarbonate, sodium carbonate, and potassium carbonate.

10. A process according to claim 9 wherein said inert material is selected from the class consisting of sodium bicarbonate and potassium bicarbonate.

11. A process for intimate incorporation of photostabilizer in the tinted region of partially tinted plasticized polyvinyl butyral sheeting during the application of a coating of an inert powder selected from the class consisting of sodium bicarbonate and potassium bicarbonate, said process comprising (1) applying to the tinted region of the sheeting a coating of a mixture of said photostabilizer in said inert powder and to the untinted region a coating of said inert powder alone, and (2) maintaining the sheeting so treated at a temperature in the range 40–70° C. for a period of time in the range 4–21 days, whereby said photostabilizer diffuses into said sheeting, 12. A process according to claim 11 wherein said photostabilizer is 2-(2'-hydroxy-5'-methylphenyl)benzotriazole, said process additionally comprising the step of winding the coated sheeting onto rolls prior to maintaining the coated sheeting at said temperature.

13. A process according to claim 11 wherein in step (2) the temperature is in the range 55–65° C. and the time 5–10 days.

References Cited
UNITED STATES PATENTS

| | | | |
|---|---|---|---|
| 2,727,843 | 12/1955 | Tillyer | 117—33.3 |
| 3,085,548 | 4/1963 | Sheehan | 117—16 |
| 3,189,615 | 6/1965 | Heller et al. | 117—33.3 |
| 3,279,462 | 1/1967 | Fanning | 117—33.3 |

WILLIAM D. MARTIN, *Primary Examiner.*

R. M. SPEER, *Assistant Examiner.*

U.S. Cl. X.R

117—25, 33.3, 138.8